(12) United States Patent
Martz et al.

(10) Patent No.: US 7,972,701 B2
(45) Date of Patent: *Jul. 5, 2011

(54) SUBSTRATES COATED WITH A POLYUREA COMPRISING A (METH)ACRYLATED AMINE REACTION PRODUCT

(75) Inventors: Jonathan T. Martz, Glenshaw, PA (US); Thomas R. Hockswender, Gibsonia, PA (US); Steven V. Barancyk, Wexford, PA (US); Howard Senkfor, South Euclid, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1105 days.

This patent is subject to a terminal disclaimer.

(21) Appl. No.: 11/611,984

(22) Filed: Dec. 18, 2006

(65) Prior Publication Data

US 2007/0160853 A1 Jul. 12, 2007

Related U.S. Application Data

(63) Continuation-in-part of application No. 11/211,188, filed on Aug. 25, 2005, now Pat. No. 7,611,772.

(51) Int. Cl.
*B32B 27/00* (2006.01)
*C08G 18/32* (2006.01)
*C08G 18/60* (2006.01)

(52) U.S. Cl. ............... 428/425.8; 525/452; 525/453; 525/458; 528/68; 528/288; 428/423.1

(58) Field of Classification Search ................ None
See application file for complete search history.

(56) References Cited

U.S. PATENT DOCUMENTS

| | | | |
|---|---|---|---|
| 2,759,913 A | 8/1956 | Hulse | |
| 3,963,771 A | 6/1976 | Robson et al. | |
| 4,045,416 A | 8/1977 | Robson et al. | |
| 4,281,089 A | 7/1981 | Pazos | |
| 4,581,407 A * | 4/1986 | Schmid | 524/548 |
| 4,608,409 A * | 8/1986 | Coady et al. | 524/199 |
| 4,690,501 A * | 9/1987 | Zimmerman et al. | 385/141 |
| 4,742,147 A * | 5/1988 | Nichols | 528/75 |
| 5,192,814 A | 3/1993 | Oshima et al. | |
| 5,306,764 A | 4/1994 | Chen | |
| 5,367,095 A | 11/1994 | Ohshima et al. | |
| 5,550,198 A | 8/1996 | Oshima et al. | |
| 5,674,942 A * | 10/1997 | Hill et al. | 525/131 |
| 5,902,897 A | 5/1999 | Wamprecht et al. | |
| 6,369,189 B1 | 4/2002 | Naderhoff et al. | |
| 6,613,389 B2 | 9/2003 | Li et al. | |
| 7,001,948 B2 | 2/2006 | Gupta et al. | |
| 2006/0046068 A1 | 3/2006 | Barancyk | |

FOREIGN PATENT DOCUMENTS

| | | |
|---|---|---|
| WO | 01/42328 | 6/2001 |
| WO | 2006028728 | 3/2006 |
| WO | 2006028732 | 3/2006 |

OTHER PUBLICATIONS

Takas, Timothy P, "100% Solids Aliphatic Polyurea Coatings for Direct-to-Metal Applications", JCT CoatingsTech, May 2004; pp. 40-45, Federation of Societies for Coating Technology, Blue Bell, Pennsylvania, United States of Pennsylvania.
U.S. Appl. No. 11/611,979, filed Dec. 18, 2006, entitled: "Polyurea Coating Comprising an Amine/(Meth)Acrylate Oligomeric Reaction Product", Steven V. Barancyk et al.
U.S. Appl. No. 11/611,982, filed Dec. 18, 2006, entitled: "Polyurea Coating Comprising a Polyamine/Mono(Meth)Acrylate Reaction Product", Steven V. Barancyk et al.
U.S. Appl. No. 11/611,986, filed Dec. 18, 2006, entitled: "Triamine/Aspartate Curative and Coatings Comprising the Same", Howard Senkfor et al.
U.S. Appl. No. 11/611,987, filed Dec. 18, 2006, entitled: "Golf Balls Comprising (Meth)Acrylated Amine Curatives", Constantine A. Kondos et al.
U.S. Appl. No. 11/611,988, filed Dec. 18, 2006, entitled: "(Meth)Acrylate/Aspartate Amine Curatives and Coatings and Articles Comprising the Same", Steve Barancyk et al.

* cited by examiner

*Primary Examiner* — John J Figueroa
(74) *Attorney, Agent, or Firm* — Diane R. Meyers; Krisanne Shideler

(57) ABSTRACT

A metallic substrate coated at least in part with a multilayer coating composite, comprising at least one of an electrocoat layer, a base coat layer, and a clearcoat layer; and a polyurea formed from a reaction mixture comprising isocyanate and a (meth)acrylated amine reaction product of a monoamine and a poly(meth)acrylate is disclosed. The ratio of equivalents of isocyanate groups to equivalents of amine groups in the polyurea is greater than 1 and the isocyanate functional component and the (meth)acrylated amine functional component can be applied to the substrate at a volume mixing ratio of 1:1. A building comprising a building component coated at least in part with such a polyurea is also disclosed, as is a substrate coated at least in part with such a polyurea, wherein the ratio of equivalents or isocyanate to equivalents of amine groups is greater than 1.3:1.

22 Claims, No Drawings

SUBSTRATES COATED WITH A POLYUREA COMPRISING A (METH)ACRYLATED AMINE REACTION PRODUCT

CROSS-REFERENCE TO RELATED APPLICATION

This patent application is a Continuation-In-Part (CIP) of patent application Ser. No. 11/211,188 filed on Aug. 25, 2005, hereby incorporated by reference in its entirety

FIELD OF INVENTION

The present invention is directed to substrates coated at least in part with a polyurea, wherein the polyurea is formed from a reaction mixture comprising isocyanate and the (meth) acrylated amine reaction product of a monoamine and a poly (meth)acrylate, wherein the ratio of equivalents of isocyanate groups to equivalents of amine groups is greater than 1, and the isocyanate and the (meth)acrylated amine reaction product can be applied to the substrate at a volume mixing ratio of 1:1.

BACKGROUND OF THE INVENTION

Coating compositions comprising polyureas are used in a wide variety of industries such as automotive, watercraft, aircraft, industrial, construction, military, recreational equipment including sports equipment and the like. In these industries, considerable efforts have been made to develop coating compositions that will impart the desired properties to the substrate or article being coated. For example, coatings are used to protect against damage due to corrosion, abrasion, impact, chemicals, ultraviolet light, flame, and/or other environmental exposure. In addition to any of these functional properties, coatings can also be used for decorative purposes.

Polyureas are generally formed by reacting amines and isocyanates. The use of amines such as polyamines as crosslinkers or "curatives" is well known. For example, amines are known to crosslink with isocyanates to form urea compounds. Amines are also known to be reactive with, and therefore used with, activated unsaturated groups, epoxy groups, aromatic activated aldehyde groups, cyclic carbonate groups, and acid and anhydride and ester groups. Polyamine crosslinkers with primary amino groups can be quite reactive with some of these functionalities under ambient or low temperature conditions (i.e. less than 100° C.). This high reactivity can result in too short a potlife or other difficulties in application, such as in high pressure impingement spraying. Certain aliphatic secondary amines, however, are not reactive enough with these various functionalities. It is therefore desired to provide amine curatives that are sufficiently reactive, but that provide an adequate potlife. There is a further desire to provide such amine curatives that impart the desired characteristics to the final composition in which they are used.

SUMMARY OF THE INVENTION

The present invention is directed to a metallic substrate coated at least in part with a multi-layer coating composite comprising at least one of an electrocoat layer, a base coat layer, and a clearcoat layer; and a coating comprising a polyurea formed from a reaction mixture comprising isocyanate and a (meth)acrylated amine reaction product of a monoamine and a poly(meth)acrylate wherein the ratio of equivalents of isocyanate groups to equivalents of amine groups is greater than 1 and the isocyanate and the (meth)acrylated amine reaction product can be applied to the substrate at a volume mixing ratio of 1:1.

The present invention is further directed to a substrate coated at least in part with a coating comprising a polyurea formed from a reaction mixture comprising isocyanate and a (meth)acrylated amine reaction product of a monoamine and a (meth)acrylate, wherein the ratio of equivalents of isocyanate groups to equivalents of amine groups is greater than 1.3:1 and the isocyanate and the (meth)acrylated amine reaction product can be applied to the substrate at a volume mixing ratio of 1:1.

The present invention is further directed to a building having a building component coated at least in part with a coating comprising a polyurea formed from a reaction mixture comprising isocyanate and a (meth)acrylated amine reaction product of a monoamine and a (meth)acrylate, wherein the ratio of equivalents of isocyanate groups to equivalents of amine groups is greater than 1 and the isocyanate and the (meth)acrylated amine reaction product can be applied to the building component at a volume mixing ratio of 1:1.

DETAILED DESCRIPTION OF THE INVENTION

The present invention is directed to a metallic substrate coated at least in part with a multilayer coating composite comprising at least one of an electrocoat layer, base coat layer, and a clearcoat layer; and a coating comprising a polyurea formed from a reaction mixture comprising isocyanate and a (meth)acrylated amine reaction product of a monoamine and a poly(meth)acrylate, wherein the ratio of equivalents of isocyanate groups to equivalents of amine groups is greater than 1 and the isocyanate and the (meth)acrylated amine reaction product can be applied to the substrate at a volume mixing ratio of 1:1. The reaction product is sometimes referred to herein as the "(meth)acrylated reaction product", or simply the "(meth)acrylated amine" or "reaction product" or like terms, and that reaction product may be referred to herein as a "curative" because it will react or cure with the isocyanate to form a polyurea.

As used herein, the term "isocyanate" includes unblocked compounds capable of forming a covalent bond with a reactive group such as a hydroxyl or amine functional group. Thus, isocyanate can refer to "free isocyanate", which will be understood to those skilled in the art. In alternate non-limiting embodiments, the isocyanate of the present invention can be monofunctional containing one isocyanate functional group (NCO) or the isocyanate used in the present invention can be polyfunctional containing two or more isocyanate functional groups (NCOs).

Suitable isocyanates for use in the present invention are numerous and can vary widely. Such isocyanates can include those that are known in the art. Non-limiting examples of suitable isocyanates can include monomeric and/or polymeric isocyanates. The polyisocyanates can be selected from monomers, prepolymers, oligomers, or blends thereof. In an embodiment, the polyisocyanate can be $C_2$-$C_{20}$ linear, branched, cyclic, aromatic, or blends thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate and mixtures thereof.

In a non-limiting embodiment, polyisocyanate monomer may be used. It is believed that the use of a polyisocyanate monomer (i.e., residual-free monomer from the preparation of prepolymer) may decrease the viscosity of the polyurea composition thereby improving its flowability, and may provide improved adhesion of the polyurea coating to a previously applied coating and/or to an uncoated substrate. For example, the coatings that form part of the multilayer coating composite, especially the outer most layer that is in direct contact with the polyurea described herein, can comprise functional groups (e.g. hydroxy groups) that are reactive with isocyanate, thereby enhancing adhesion of the coating to the polyurea applied over this coating. A lower viscosity polyurea composition may also remain in a "flowable" state for a longer period of time as compared to a comparable composition having a higher viscosity. In alternate embodiments of the present invention, at least 1 percent by weight, or at least 2 percent by weight, or at least 4 percent by weight of the isocyanate component comprises at least one polyisocyanate monomer.

In a further embodiment of the invention, the isocyanate can include oligomeric polyisocyanates including but not limited to dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including but not limited to carbodiimides and uretdiones, and mixtures thereof. Suitable materials include, without limitation, those available under the designation DESMODUR from Bayer Corporation of Pittsburgh, Pa. and include DESMODUR N 3200, DESMODUR N 3300, DESMODUR N 3400, DESMODUR XP 2410, and DESMODUR XP 2580.

As used herein, "isocyanate prepolymer" means polyisocyanate that is pre-reacted with polyamine or another isocyanate reactive group such as polyol. Suitable polyisocyanates include those previously disclosed herein. Suitable polyamines are numerous and may be selected from a wide variety known in the art. Examples of suitable polyamines include but are not limited to primary and secondary amines, and mixtures thereof, such as any of those listed herein. Amine terminated polyureas may also be used. Amines comprising tertiary amine functionality can be used provided that the amine further comprises at least two primary and/or secondary amino groups. Suitable polyols are numerous and may be selected from a wide variety known in the art. Examples of suitable polyols include but are not limited to polyether polyols, polyester polyols, polyurea polyols (e.g. the Michael reaction product of an amino function polyurea with a hydroxyl functional (meth)acrylate), polycaprolactone polyols, polycarbonate polyols, polyurethane polyols, poly vinyl alcohols, addition polymers of unsaturated monomers with pendent hydroxyl groups such as those containing hydroxy functional (meth)acrylates, allyl alcohols and mixtures thereof.

In certain embodiments, the isocyanate includes an isocyanate prepolymer and in other embodiments the isocyanate includes an isocyanate prepolymer and one or more additional isocyanates, such as one or more of the polyisocyanates described above.

As noted above, the polyurea used according to the present invention is formed from a reaction mixture comprising isocyanate and the (meth)acrylated amine reaction product of a monoamine and poly(meth)acrylate. As used herein and as will be understood by one skilled in art the term "(meth) acrylate" denotes both the acrylate and the corresponding (meth)acrylate. The poly(meth)acrylate can be any suitable poly(meth)acrylate and mixtures thereof. In certain embodiments the poly(meth)acrylate comprises di(meth)acrylate, in certain embodiments the poly(meth)acrylate comprises tri (meth)acrylate, and in certain embodiments the poly(meth) acrylate comprises tetra(meth)acrylate. Suitable di(meth)acrylates include, but are not limited to, ethylene glycol di(meth)acrylate, 1,3-butylene glycol di(meth)acrylate, 1,4-butanediol di(meth)acrylate, 2,3-dimethylpropane 1,3-di (meth)acrylate, 1,6-hexanediol di(meth)acrylate, propylene glycol di(meth)acrylate, dipropylene glycol di(meth)acrylate, tripropylene glycol di(meth)acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxyolated neopentyl glycol di(meth)acrylate, pentanediol di(meth)acrylate, cyclohexane dimethanol di(meth)acrylate, ethoxylated bis-phenol A di(meth)acrylate, and mixtures thereof. Non-limiting examples of tri and higher (meth)acrylates may include glycerol tri(meth)acrylate, trimethylolpropane tri(meth)acrylate, ethoxylated trimethylolpropane tri (meth)acrylate, propoxylated trimethylolpropane tri(meth) acrylate, ditrimethylolpropane tetra(meth)acrylate, pentaerythritol tetra(meth)acrylate, ethoxylated pentaerythritol tetra(meth)acrylate, propoxylated pentaerythritol tetra (meth)acrylate, and dipentaerythritol penta(meth)acrylate. Other suitable poly(meth)acrylate oligomers include (meth) acrylate of epoxidized soya oil and urethane acrylates of polyisocyanates and hydroxyalkyl (meth)acrylates. Mixtures of poly(meth)acrylate monomers may also be used, including mixtures of mono, di, tri, and/or tetra (meth)acrylate.

Other suitable poly(meth)acrylates include urethane (meth)acrylates such as those formed from the reaction of a hydroxyl functional (meth)acrylate with a polyisocyanate or with an NCO functional adduct of a polyisocyanate and a polyol or a polyamine. Suitable hydroxyl functional (meth) acrylates include 2-hydroxyethyl, 1-methyl-2-hydroxyethyl, 2-hydroxypropyl, 2-hydroxybutyl, 4-hydroxybutyl, and the like. Suitable polyisocyanates include, without limitation, any of the monomeric or oligomeric isocyanates, or isocyanate prepolymers listed herein.

Suitable monoamines include but are not limited to those of the formula $R_2$—$NH_2$, where $R_2$ is a hydrocarbon radical that may represent a straight chain or branched alkyl group of 1 to 30 carbon atoms, an aryl-alkyl group, a hydroxyalkyl group or an alkoxyalkyl group, and include, without limitation, ethylamine, isomeric propylamines, butylamines (e.g. butylamine, isobutylamine, sec-butylamine, and tert-butylamine), pentylamines, hexylamines, cyclohexylamine, 2-ethylhexylamine, octylamine, tert-octylamine, dodecylamine, octadecylamine, and 3-(cyclohexylamine)propylamine. Polyamines are specifically excluded from the present reaction products.

The equivalent ratio of amine to poly(meth)acrylate can be any suitable ratio to give the desired properties to the (meth) acrylated amine reaction product. In an embodiment, the ratio is from 1:1 to 1.1:1 A slight excess of amine can be used to maximize conversion of acrylate groups. A larger excess of monoamine can used; it is recognized that the presence of a significant quantity of monoamine in the final coating composition may slow the cure time of the coating and reduce the crosslink density of the final product. It will be appreciated that these ratios are just examples, and that any other suitable ratios can be used according to the present invention.

The (meth)acrylated amine reaction product used according to the present invention can be formed, for example, in the manner described in the examples, or any other suitable manner. In certain embodiments, the poly(meth)acrylate is added to the amine over a period of time to control the reaction temperature since the reaction is often exothermic. The addition can be commenced at ambient temperature, or the amine can be heated prior to the beginning of the addition. In certain embodiments, it might be desired to cool the reaction mixture during the addition to control the exotherm. At the conclusion of the addition, the reaction mixture can be heated to complete the reaction. In other embodiments, the amine can be added to the poly(meth)acrylate. This may be desired when the poly(meth)acrylate is oligomeric or polymeric in nature or otherwise viscous. In still other embodiments the all reactants can be combined together in the reactor vessel and heated to reaction temperature. Generally, the reactions are conducted at a temperature of <100° C. The reaction mixture can further include additives such as free radical polymerization inhibitors such as hydroquinone, 4-methoxyphenol, 2,6-di-tert-butyl p-cresol, and phenothiazine, catalysts including but not limited to tin compounds (dibutyltin dilaurate, dibutyltin diacetate), Zn compounds, Ti compounds, tertiary amines, and solvents including but not limited to alcohols. The reactions can be run under nitrogen or air. The equivalent ratio of amine:acrylate can be any of those described above, or any other suitable ratio. In certain embodiments the reaction product is substantially free of unreacted primary amine groups. Minimizing the amount of residual primary amine in the (meth)acrylated amine slows its rate of reaction with isocyanate; thus the ratio of amine to poly(meth)acrylate can be varied depending on the level of reaction desired in the resulting (meth)acrylated amine. Accordingly, in certain other embodiments, an excess of amine to poly(meth)acrylate can be used to alter the cure speed in the subsequent polyurea composition.

The (meth)acrylated amine reaction product used according to the present invention can be the result of the reaction of any combination of monoamines and poly(meth)acrylates. The polyurea compositions used herein may also comprise more than one (meth)acrylated amine reaction product as described herein or one or more other amine curatives in addition to the (meth)acrylated amine reaction product(s). For example, the amine component of the polyurea used according to the present invention may comprise one or more amines that are the reaction product of an amine, a (meth) acrylate and a dialkyl maleate and/or dialkyl fumarate, such as those described in the U.S. patent application entitled "(Meth)Acrylate/Aspartate Amine Curatives and Coatings and Articles Comprising the Same" filed on even date herewith and hereby incorporated by reference; one or more amines that are the reaction product of a polyamine, a poly (meth)acrylate and a mono(meth)acrylate or monoamine, such as those described in the U.S. patent application entitled: "Polyurea Coating Comprising an Amine/(Meth)Acrylate Oligomeric Reaction Product" filed on even date herewith and hereby incorporated by reference; one or more amines that are the reaction product of a polyamine and a mono (meth)acrylate, such as those described in the U.S. patent application entitled: "Polyurea Coating Comprising a Polyamine/Mono(Meth)Acrylate Reaction Product" filed on even date herewith and hereby incorporated by reference; and/or one or more amines that are the reaction product of a triamine and a dialkyl maleate and/or dialkyl fumarate such as those described in the U.S. patent application entitled: "Tiamine/Aspartate Curative and Coatings Comprising the Same" filed on even date herewith and hereby incorporated by reference. Alternatively, the amine component of the polyurea used according to the present invention can further comprise the reaction product of a polyamine and a compound comprising a mono epoxide, such as ethylene oxide, propylene oxide, butylene oxide, or a glycidyl mono epoxy (commercially available as CARDURA E, from Hexion Speciality Chemicals, Inc. A reaction product of isophorone diamine and CARDURA E is particularly suitable.

The polyurea comprising the present (meth)acrylated amine reaction product and an isocyanate can additionally include other amines such as those known in the art. Suitable primary polyamines include, but are not limited to, ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2,4- and/or 2,4,4-trimethyl-1, 6-diamino-hexane, 1,11-diaminoundecane, 1,12-diaminododecane, 1,3- and/or 1,4-cyclohexane diamine, 1-amino-3, 3,5-trimethyl-5-aminomethyl-cyclohexane, 2,4- and/or 2,6-hexahydrotoluylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene and 2,4'- and/or 4,4'-diaminodiphenyl methane. Other amines include secondary cycloaliphatic diamines such as JEFFLINK 754 (Huntsman Corporation, Houston, Tex.) and CLEARLINK 1000 (Dorf-Ketal Chemicals, LLC), aspartic ester functional amines, such as those available under the name DESMOPHEN such as DESMOPHEN NH 1220, DESMOPHEN NH 1420, and DESMOPHEN NH 1520 (Bayer Corporation), other aspartic ester functional materials, such as the reaction products of triamines that comprise at least one secondary amino group prior to reaction with a dialkyl maleate and/or dialkyl fumarate including but not limited to the reaction products of diethylene triamine, dipropylene triamine, and bis-hexamethylene triamine with a dialkyl maleate and/or dialkyl fumarate as described herein; examples of such materials include the adduct of dipropylene triamine and diethyl maleate, the adduct of dipropylene triamine and dibutyl maleate, the adduct of bis-hexamethylene triamine with diethyl maleate, and the adduct of bis-hexamethylene triamine with dibutyl maleate. Polyoxyalkyleneamines are also suitable. Polyoxyalkyleneamines comprise two of more primary or secondary amino groups attached to a backbone, derived, for example, from propylene oxide, ethylene oxide, butylene oxide or a mixture thereof. Examples of such amines include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500. When more than one (meth)acrylated amine reaction product and/or isocyanate is used, each polyamine, mono (meth)acrylate and/or isocyanate can be the same or different.

Other suitable secondary amines that can be included in the present composition are reaction products of materials comprising primary amine functionality with acrylonitrile. Suitable amines include any polyamine listed herein comprising primary amino functionality. One example of such a material is the adduct of 4,4'-diaminodicyclohexylmethane and acrylonitrile. An example of a commercially available material is the adduct of isophorone diamine and acrylonitrile sold under the designation POLYCLEAR 136, (Hansen Group LLC).

In certain embodiments, the amine component of the polyurea, and/or the polyurea itself, are substantially free of primary amine functionality (unreacted primary amino groups). "Substantially free of primary amine functionality" and like terms means that theoretically there is no primary amine functionality but there maybe some primary amine functionality present that is purely incidental, i.e. impurities in amines that are otherwise secondary amine functional and/or trace primary amine functionality that did not react.

In an embodiment, the coating compositions used according to the present invention may include a blend of polyurea and polyurethane. As used herein, therefore, "polyurea" includes both polyurea and blends of polyurea and polyurethane. It will be appreciated by those skilled in the art that polyurethane can be formed as a by-product in the reactions according to the present invention. In alternate embodiments, the polyurethane can be formed in-situ and/or it can be added to the reaction mixture; a non-limiting example is an NCO functional prepolymer formed by reaction of a polyol and a polyisocyanate as disclosed herein. A non-limiting example of polyurethane formed in-situ may include the reaction product of polyisocyanate and hydroxyl-functional material. Non-limiting examples of suitable polyisocyanates may include those described herein. Non-limiting examples of suitable hydroxyl-functional material may include polyol such as those described herein. Another example of polyurethane formed in-situ may include the reaction product of a hydroxyl functional prepolymer and isocyanate-functional material. Suitable examples of these reactants may include those described herein.

The polyurea coating composition used according to the present invention may be formulated and applied using various techniques known in the art. In an embodiment, conventional spraying techniques may be used. In this embodiment, the isocyanate and amine may be combined such that the ratio of equivalents of isocyanate groups to equivalents of amine groups is greater than 1 and the isocyanate and amine can be applied to a substrate at a volume mixing ratio of 1:1. When determining the ratio of equivalents of isocyanate groups to equivalents of reactive amine groups, the total amine groups are taken into consideration, that is the amine groups from the (meth)acrylated amine curative as well as any other amine used in the coating.

In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition that is cured upon application to the uncoated or coated substrate. The A- and/or B-side can also be heated prior to application, such as to a temperature of 140° F. Heating may promote a better viscosity match between the two components, but is not necessary for the curing reaction to occur.

It will be appreciated that the present compositions can be two component or "2K" compositions, wherein the isocyanate-containing component and the amine-containing component are kept separate until just prior to application. Such compositions will be understood as curing under ambient conditions, although a heated forced air or a heat cure can be applied to accelerate final cure or to enhance coating properties such as adhesion. In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition that is cured upon application to the uncoated or coated substrate. The A- and/or B-side can also be heated prior to application, such as to a temperature of 140° F. Heating may promote a better viscosity match between the two components and thus better mixing, but is not necessary for the curing reaction to occur.

It is believed that the ratio of equivalents of isocyanate groups to amine groups may be selected to control the rate of cure of the coating composition of the present invention. It has been found that cure and adhesion advantages may result when applying the coating in a 1:1 volume ratio wherein the ratio of the equivalents of isocyanate groups to amine groups (also known as the reaction index) is greater than one, such as from 1.004 to 1.10:1, or from 1.01 to 1.10:1, or from 1.03 to 1.10:1, or from 1.05 to 1.08:1, or from 1.01 to 1.4 to 1, or from 1.01 to 1.5 to 1, or greater than 1.3 to 1. For example, good adhesion can be obtained using these ratios over clearcoats that have low surface functionality after cure, such as carbamate melamine, hydroxyl melamine, 2K urethane, and silane-containing clearcoats. The term "1:1 volume ratio" means that the volume ratio varies by up to 20% for each component, or up to 10% or up to 5%.

In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers and are impacted or impinged upon each other at high velocity to mix the two components and form a coating composition, which may be applied to an uncoated or coated substrate using the spray gun. The mixing forces experienced by the component streams may be depend upon the volume of each stream entering the mixing chamber per unit time and the pressure at which the component streams are delivered. A 1:1 volume ratio of the isocyanate and amine per unit time may equalize these forces.

Another suitable application device known in the industry includes a "istatic mix tube" applicator. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation.

The polyurea coating compositions used according to the present invention may be applied to a wide variety of substrates. Accordingly, the present invention is further directed to a substrate coated with any of the composition described herein. Non-limiting examples of suitable substrates can include but are not limited to metal, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, ballistic composites, asphalt, fiberglass, soil, gravel and the like. "Metallic substrate(s)" includes substrates comprising metal(s) and/or metal alloys, including but not limited to aluminum, any form of steel such as cold rolled steel, electrogalvanized steel, hot dipped galvanized steel, titanium and the like. Plastics can include but are not limited to TPO, SMC, TPU, polypropylene, polycarbonate, polyethylene, polyamides (Nylon). The substrates can be primed metal and/or plastic; that is, an organic or inorganic layer is applied thereto. Further, the coating compositions of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. In non-limiting examples, the coating compositions of the present invention can be applied to at least a portion of a building component or an article of manufacture such as but not limited to a vehicle. "Vehicle" includes but is not limited to civilian, commercial, and military land-, water-, and air-vehicles, for example, cars, trucks, boats, ships, submarines, airplanes, helicopters, humvees and tanks. The article of manufacture can be a building structure. "Building component" and like terms includes but is not limited to at least a portion of a structure including residential, commercial and military structures, for example, roofs, floors, support beams, walls and the like. As used herein, the term "substrate" may refer to a surface, either external or internal, on at least a portion of an article of manufacture, the article of manufacture itself, a building component and the like. In an embodiment, the substrate is a truck bed.

In an embodiment, the polyurea coating composition used in the present invention may be applied to a carrier film prior to application to the substrate. The carrier film can be selected from a wide variety of such materials known in the art. Non-limiting examples of suitable carrier films may include, but are not limited to thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples may include polyurethane polymers, polyester polymers, polyamide polymers, polyurea polymers, polycarbonate polymers, acrylic polymers, aminoplasts, isocyanates, epoxies, copolymers thereof, and mixtures thereof.

As noted above, the polyurea coating compositions used according to the present invention are applied in certain embodiments as part of a multi-layer coating composite comprising at least one of an electrocoat layer, a base coat layer, and a clearcoat layer, in addition to the polyurea layer described above. In certain embodiments, at least two of an electrocoat layer, a base coat layer and a clearcoat layer are used in addition to the polyurea layer described above and in yet other embodiments an electrocoat later, a base coat layer and a clear coat layer are all used in addition to the polyurea layer described above. An electrocoat layer is one deposited from an electrodepositable film-forming composition, typically used in a variety of industries for decorative and/or protective purposes. A base coat layer can be deposited from any pigmented or non-pigmented base coat composition. Typically, a pigmented base coat is used in conjunction with a clearcoat. A clearcoat layer can be deposited from any clearcoat composition. In an embodiment, the clearcoat comprises silane functional groups either before or after crosslinking and cure. In another embodiment, the clearcoat has low surface functionality after cure, such as carbamate melamine, hydroxyl melamine, 2K urethane, and silane-containing clearcoats. Any number of additional coating and/or treatment layers can be used according to the present invention in conjunction with the electrocoat, base coat, and/or clearcoat, and polyurea layers according to the present invention, such as pretreatment layers before the electrocoat layer, primer layers, additional electrocoat, base coat and/or clearcoat layers and the like.

In certain embodiments, the polyurea coating layer can be used in a two-coat application resulting in a textured surface on a substrate. A first coat is applied to an uncoated or coated substrate to produce a smooth, substantially tack-free layer. The "Tack-Free Method" is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available as AMBIDEX Disposable Vinyl Glove by Marigold Industrial, Norcross GA, gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack-free time. In a non-limiting embodiment, the tack-free time and the cure time may be controlled by balancing levels of various composition components such as the ratio of primary amine to secondary amine.

A second polyurea layer may then be applied to the first polyurea layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. An overall thickness of the coating layers may range from 20 to 1000 mils, or from 40 to 150 mils, or from 60 to 100 mils (1524-2540 microns), or from 500 to 750 mils. In a non-limiting embodiment, the first layer may be the majority of the total thickness and the dust coating may be from 15-50 mils (381-1270 microns).

In various embodiments of the present invention, the "first" polyurea coating layer may comprise one, two, three or more layers; and the "second" polyurea coating layer may be one or more subsequent layers applied thereover. For example, four polyurea layers may be applied, with the fourth layer being the dust coating and each layer having a thickness of from 15 to 25 mil (381-635 microns). It will be appreciated that these coating layers are relatively "thick". The polyurea coating layers of the present invention can also be applied as much thinner layers as well, such as 0.1 to less the 15 mils, such as 0.1 to 10, 0.5 to 3 or 1 to 2 mils. Such layers can be used alone or in conjunction with other coating layers either as described above or as otherwise known in the art.

In alternate embodiments, the polyurea coating layers applied to at least a portion of the present substrates may comprise the same or different polyurea coating compositions. For example, the first layer may be a polyurea composition comprising aliphatic and/or aromatic amine components and/or aliphatic and/or aromatic polyisocyanate, and the second layer may comprise the same or different combination of aliphatic and/or aromatic amine components and/or aliphatic and/or aromatic polyisocyanate. "Amine component" in this context means any amine used in the coatings according to the present invention. In a further embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or polyisocyanate may be selected such that the composition of the outermost layer has substantial durability. For example, the outermost coating layer may have a durability of 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising polyisocyanate and amine, wherein at least one of the amine and/or polyisocyanate may comprise an aromatic moiety, and the second layer may be a polyurea composition comprising predominantly aliphatic amine and aliphatic polyisocyanate, with little or no aromaticity.

The polyurea coating compositions used in the present invention may optionally include materials standard in the art such as but not limited to fillers, fiberglass, stabilizers, thickeners, fillers, adhesion promoters, catalysts, colorants, antioxidants, UV absorbers, hindered amine light stabilizers, rheology modifiers, flow additives, anti-static agents and other performance or property modifiers that are well known in the art of surface coatings, and mixtures thereof. For example, the present coatings can further comprise flame and/or heat resistant material, such as any one or more of those disclosed in U.S. application Ser. No. 11/591,312, hereby incorporated by reference in its entirety. Fillers can include clay and/or silica, and adhesion promoters can include amine functional materials, aminosilanes and the like; examples of fillers and adhesion promoters are further described in U.S. Publication No. 2006/0046068, hereby incorporated by reference in its entirety. These additives can be combined with the isocyanate, the (meth)acrylated amine reaction product, or both. In certain embodiments, the polyurea coating may further comprise small amounts of solvent and in certain embodiments the polyurea may be substantially solvent-free. "Substantially solvent-free" means that the polyurea may contain a small amount of solvent, such as 5%, 2%, 1% or less.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art. The grind vehicle can also comprise the (meth) acrylated amine curative described above either in total or in combination with the other amines and polyols as described herein.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers, and mixtures thereof. The terms "pigment" and "colored filler" can be used interchangeably.

Example dyes include, but are not limited to, those that are solvent based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the polyurea coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 0.1 to 65 weight percent of the present compositions, such as from 3 to 40 weight percent or 5 to 35 weight percent, with weight percent based on the total weight of the compositions. In certain embodiments, the weight percent of pigment may be 0.1 to 1.0 weight percent.

In another embodiment, the coated substrates of the present invention possess color that matches the color of an associated substrate. As used herein, the term "matches" or like terms when referring to color matching means that the color of the coating composition of the substrate of the present invention substantially corresponds to a desired color or the color of an associated substrate. For instance, when the substrate for the polyurea coating composition is a portion of a vehicle, such as a truck bed, the color of the coating substantially matches that of the associated vehicle body. This can be visually observed, or confirmed using spectroscopy equipment. An article of manufacture or building component coated according to the present invention may have a multilayer coating composite comprising a pretreated or unpretreated substrate with one or more of various coating layers such as electrocoat, primer, base coat and/or clear coat. At least one of the base coat and clear coat may contain pigment and/or the clear coat may contain an adhesion promoter. It is believed that the addition of adhesion promoter to the clear coat, or to its surface, may improve the adhesion between the clear coat and the polyurea coating composition applied thereover, although the inventors do not wish to be bound by any mechanism. In this embodiment, the polyurea coating composition used may be the reaction product of isocyanate and the (meth)acrylated amine reaction product with a pigment additive. The polyurea coating composition described herein containing pigment may be applied to at least a portion of the article, building component, or other substrate. The color of the coated article, building component or substrate may match the color of an associated substrate. An "associated substrate" may refer to a substrate that comprises the article or structure but is not coated with the coating composition of the present invention, or a substrate that is attached, connected or in close proximity to the article or structure, but is not coated with the polyurea coating described herein.

Accordingly, certain embodiments are directed to a building having a building component coated at least in part with a coating comprising a polyurea formed from a reaction mixture comprising isocyanate and a (meth)acrylated amine reaction product of a monoamine and a poly(meth)acrylate, wherein the ratio of equivalents of isocyanate groups to equivalents of amine groups is greater than 1 and the isocyanate and the (meth)acrylated amine reaction product can be applied to the building component at a volume mixing ratio of 1:1. The (meth)acrylated amine reaction product and the polyurea can be as described above. The building components can be any of those described herein, and can be formed from any substrate or substrates suitable for building components, such as any of the substrates listed herein. The polyurea may be applied to a building component that is a bare (e.g. untreated and/or uncoated) substrate, a pretreated substrate and/or a substrate, having at least one other coating layer. Such layers can include sealers, primers, pigmented and unpigmented basecoats, topcoats and/or industrial coating layers. When applied at a sufficient thickness (e.g. 10 to 1000 mils), the present polyurea layer(s) can provide blast mitigation. "Blast mitigation" means, for example, protection in the event of a close proximity blast or explosion. This protection can include, for example, protection of a structure or portion of a structure, such as a building structure, vehicle, aircraft, ship/boat, shipping container and the like, from collapse and/or destruction, protection against flying debris and blast fragments and the like.

Certain embodiments of the present invention are directed to a substrate coated at least in part with a coating comprising a polyurea formed from a reaction mixture comprising isocyanate and a (meth)acrylated amine reaction product of a monoamine and a poly(meth)acrylate, wherein the ratio of the equivalents of isocyanate groups to equivalents of amine groups is greater than 1.3:1, and the isocyanate and the (meth)

acrylated amine reaction product can be applied to the substrate at a volume mixing ratio of 1:1. The (meth)acrylated amine reaction product and the polyurea can be as described above. The substrate can be any of the substrates described above, and can be a bare (e.g. untreated and/or uncoated) substrate, a pretreated substrate and/or a substrate, having at least one other coating layer. Such layers can include sealers, primers, pigmented and unpigmented basecoats, topcoats and/or industrial coating layers. When applied at a sufficient thickness (e.g. 10 to 1000 mils, such as 100 to 200 mils, or 125 mils+/−10 mils), the present polyurea layer(s) can provide blast mitigation. "Blast mitigation" means, for example, protection in the event of a close proximity blast or explosion. This protection can include, for example, protection of a structure or portion of a structure, such as a building structure, vehicle, aircraft, ship/boat, shipping container and the like, from collapse and/or destruction, protection against flying debris and blast fragments, and the like.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described herein including the claims in terms of "a" polyurea, "an" isocyanate, "a" monoamine, "a" poly(meth)acrylate, "a" (meth)acrylated amine reaction product and the like, mixtures of such things can be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way. As will be appreciated by those skilled in the art MW refers to average molecular weight, $M_w$ refers to weight average molecular weight and $M_n$ refers to number average molecular weight.

Example A

An amine/acrylate curative was prepared from the following ingredients:

| Ingredient | Wt in g |
|---|---|
| Charge 1 | |
| 2-ethylhexylamine | 387.8 |
| Charge 2 | |
| Trimethylolpropane triacrylate | 294.0 |

Charge 1 was added to a suitable reactor equipped with an overhead stirrer, thermocouple, condenser, and $N_2$ inlet. The charge was placed under an $N_2$ blanket. Beginning at a temperature of 24° C., Charge 2 was added to the reactor over a period of 45 minutes. A mild exotherm was observed during the addition. At the completion of the charge, the temperature of the reaction mixture was 26° C. The contents of the reactor were heated to 35° C. with an external heat source and held at this temperature for 2 hours. Inspection of the infrared spectrum at this time indicated consumption of the acrylate (absence of peaks at 1621, 1635 cm$^{-1}$). The resulting material was found to have a measured solids content of (110° C., 1 hr) of 89.5 percent, a viscosity of C-D on the Gardner-Holt scale, a density of 7.93 lb/gal, a total amine content of 4.098 meq/g, and a $M_w$ of 928 and a $M_n$ of 692 as determined by gel permeation chromatography vs. a polystyrene standard.

Example B

An amine/epoxy adduct was prepared from the following ingredients:

| Ingredient | Wt in g |
|---|---|
| Charge 1 | |
| Isophorone diamine | 2044.8 |
| Charge 2 | |
| CARDURA E10 P[1] | 6000.0 |

[1]Glycidyl ether of neodecanoic acid, available from Hexion Specialty Chemicals, Inc.

Charge 1 was added to a suitable reactor equipped with an overhead stirrer, thermocouple, condenser, and $N_2$ inlet. The charge was placed under an $N_2$ blanket and heat applied to the reactor. Beginning at a temperature of 62° C., Charge 2 was added to the reactor over a period of 6.9 hours over a temperature range of 62 to 92° C. During the feed, the heating mantle was raised or lowered and cooling (water bath or air flow) applied to the reactor as required to control the reaction temperature. At the completion of the addition, the temperature of the reaction mixture was 77° C. The reaction mixture was held at 80° C. for 8.6 hours, then at 85° C. for 1.6 hours. At this time the epoxy equivalent weight was found to be 55556, and the reaction was judged to be complete. The resulting material was found to have a measured solids content of (110° C., 1 hr) of 98.7 percent, a viscosity of Z10 on the Gardner-Holt scale, a total amine content of 2.969 meq/g, a residual primary amine content of 0.170 meq/g, a secondary amine content of 2.504 meq/g, a tertiary amine content of 0.295 meq/g, a hydroxyl value of 160.1, and a $M_w$ of 657 and a $M_n$ of 562 as determined by gel permeation chromatography vs. a polystyrene standard.

Example C

An aspartate modified amine curative with a secondary non-aspartate amino group was prepared from the following ingredients:

| Ingredient | Wt in g |
|---|---|
| Charge 1 | |
| Bishexamethylene triamine | 172.5 |
| Charge 2 | |
| Diethyl maleate | 264.1 |

Charge 1 was added to a suitable flask equipped with an overhead stirrer, thermocouple, condenser, and $N_2$ inlet. The charge was placed under an $N_2$ blanket. Beginning at a temperature of 60° C., Charge 2 was added to the flask over a period of 4.5 hours. A slight exotherm was observed during the addition. A maximum temperature of 67° C. was observed during the addition of this charge. At the completion of the charge, the temperature of the reaction mixture was 61° C. The reaction mixture was heated to a temperature of 70° C. with an external heat source and held at this temperature for 2.75 hours. Inspection of the infrared spectrum of the reaction mixture indicated consumption of diethyl maleate (disappearance of peak at 1646 cm$^{-1}$). The resulting material was found to have measured solids content (110° C., 1 hr) of 98.3 percent, a viscosity of F+ on the Gardner-Holt scale, a density of 8.55 lb/gal, a total amine content of 5.17 meq/g, a residual primary amine content of 0.077 meq/g, a secondary amine content of 5.032 meq/g, a tertiary amine content of 0.066 meq/g, and a $M_w$ of 547 and a $M_n$ of 445 as determined by gel permeation chromatography vs. a polystyrene standard.

Example D

An acrylate/aspartate amine curative was prepared from the following ingredients:

| Ingredient | Wt in g |
|---|---|
| Charge 1 | |
| Isophorone diamine | 170.4 |
| 2,6-di-tert-butyl p-cresol | 0.2 |
| Charge 2 | |
| Diethyl maleate | 168.8 |
| Charge 3 | |
| 2,6-di-tert-butyl p-cresol | 3.5 |
| Charge 4 | |
| Butyl acrylate | 125.4 |

Charge 1 was added to a suitable flask equipped with an overhead stirrer, thermocouple, condenser, and N$_2$ inlet. The charge was placed under an N$_2$ blanket. Beginning at a temperature of 21° C., Charge 2 was added to the flask over a period of 45 minutes. An exotherm was observed during the addition. At the completion of the charge, the temperature of the reaction mixture was 45° C. The reaction mixture was heated to a temperature of 50° C. with an external heat source and held at this temperature for 3.25 hours. Inspection of the infrared spectrum of the reaction mixture indicated consumption of dibutyl maleate (disappearance of peak at 1646 cm$^{-1}$). Charge 3 was added to the reactor, then Charge 4 was added to the reaction mixture over 45 minutes; at the completion of Charge 4 the reaction temperature was 50° C. The reaction mixture was held at this temperature for 2.9 hours. Inspection of the infrared spectrum of the reaction mixture indicated the presence of unreacted acrylate (peaks at 1621, 1635 cm$^{-1}$). The temperature of the reaction mixture was raised to 70° C. and held for 4 hours. Inspection of the infrared spectrum of the reaction mixture indicated the acrylate was consumed. The resulting material was found to have measured solids content (110° C., 1 hr) of 92.0 percent, a viscosity of C on the Gardner-Holt scale, a density of 8.41 lb/gal, a total amine content of 4.165 meq/g, a residual primary amine content of 0.026 meq/g, a secondary amine content of 4.139 meq/g, a tertiary amine content of 0.000 meq/g, and a $M_w$ of 489 and a $M_n$ of 415 as determined by gel permeation chromatography vs. a polystyrene standard.

Example E

An acrylate/aspartate amine curative was prepared from the following ingredients:

| Ingredient | Wt in g |
|---|---|
| Charge 1 | |
| Isophorone diamine | 2982.0 |
| 2,6-di-tert-butyl p-cresol | 3.5 |
| Charge 2 | |
| Dibutyl maleate | 1995.0 |
| Charge 3 | |
| 2,6-di-tert-butyl p-cresol | 3.5 |
| Charge 4 | |
| Butyl acrylate | 3270.4 |

Charge 1 was added to a suitable flask equipped with an overhead stirrer, thermocouple, condenser, and N$_2$ inlet. The charge was placed under an N$_2$ blanket. Beginning at a temperature of 21° C., Charge 2 was added to the flask over a period of 5.75 hours. A mild exotherm was observed during the addition. A maximum temperature of 35° C. was observed during the addition of this charge. At the completion of the charge, the temperature of the reaction mixture was 33° C. The reaction mixture was heated to a temperature of 35-37° C. with an external heat source and held at this temperature for 3 hours. Inspection of the infrared spectrum of the reaction mixture indicated consumption of dibutyl maleate (disappearance of peak at 1646 cm-1). Charge 3 was added to the reactor, and the reaction mixture heated to 43° C. Charge 4 was added to the reaction mixture for 3.6 hours; a mild exotherm was observed. The temperature range of the reaction mixture over the course of Charge 4 was between 43 and 50° C.; at the completion of Charge 4 the temperature was 45° C. The temperature of the reaction mixture was then raised to 50° C. and held for 3 hours. Inspection of the infrared spectrum of the reaction mixture indicated the presence of unreacted acrylate (peaks at 1621, 1635 cm-1). The temperature of the reaction mixture was raised to 70° C. and held for 10.9 hours. Inspection of the infrared spectrum of the reaction mixture indicated that the presence of the peaks attributed to the acrylate could not be distinguished from baseline noise; at this point the reaction was judged to be complete. The resulting material was found to have measured solids content (110° C., 1 hr) of 98.9 percent, a viscosity of D on the Gardner-Holt scale, a density of 8.17 lb/gal, a total amine content of 4.21 meq/g, a residual primary amine content of 0.230 meq/g, a secondary amine content of 3.985 meq/g, a tertiary amine content of 0.000 meq/g, and a $M_w$ of 450 and a $M_n$ of 406 as determined by gel permeation chromatography vs. a polystyrene standard.

Example F

A difunctional urethane acrylate was prepared from the following ingredients:

| Ingredient | Wt in g |
| --- | --- |
| Charge 1 | |
| DESMODUR W[2] | 419.2 |
| Dibutyltin dilaurate | 0.41 |
| 2,6-di-tert-butyl p-cresol | 2.11 |
| Charge 2 | |
| Hydroxypropyl acrylate | 416.0 |
| Charge 3 | |
| Hydroxypropyl acrylate | 43.2 |

[2]Methylene bis(4-cyclohexylisocyanate), available from Bayer Corporation.

Charge 1 was added to a suitable reactor equipped with an overhead stirrer, thermocouple, condenser, and air inlet. The charge was placed under an air blanket. Beginning at a temperature of 59° C., Charge 2 was added to the reactor over a period of 1.8 hours over a temperature range of 59 to 62° C. The reaction was held for approximately 2.8 hours at this temperature. An infrared spectrum of the reaction mixture indicated the presence of isocyanate. Over the next 9.8 hours, Charge 3 was added to the reaction mixture in five portions and the temperature gradually increased to 87° C.; an additional 0.2 g of dibutyltin dilaurate were also added to the reaction mixture during this time. The reaction mixture was held at 87° C. for an additional 4.6 hours. At this point, the infrared spectrum of the reaction mixture showed that the isocyanate was consumed. The material was determined to have a $M_w$ or 674 and a $M_n$ of 581 as determined by gel permeation chromatography vs. a polystyrene standard.

Example G

An amine/acrylate curative was prepared from the following ingredients:

| Ingredient | Wt in g |
| --- | --- |
| Charge 1 | |
| Difunctional urethane/acrylate of Example F | 261.8 |
| 2,6-di-tert-butyl p-cresol | 0.73 |
| Charge 2 | |
| Cyclohexylamine | 108.0 |
| Charge 3 | |
| Cyclohexylamine | 7.5 |
| Charge 4 | |
| Acrylate/aspartate amine curative of Example E | 372.0 |

Charge 1 was added to a suitable reactor equipped with an overhead stirrer, thermocouple, condenser, and air inlet. The charge was placed under an air blanket and heated. Beginning at a temperature of 55° C., Charge 2 was added to the reactor over a period of 2.5 hours. At the completion of the charge, the temperature of the reaction mixture was 50° C. The contents of the reactor were heated to 60° C. and held at this temperature for 7.1 hours. Inspection of the infrared spectrum at this time indicated presence of acrylate (peaks at 1621, 1635 cm$^{-1}$). Over the next 10.8 hours the temperature was raised to 89° C. and Charge 3 added to the reaction mixture. Inspection of the infrared spectrum at the completion of this time indicated consumption of acrylate. At a temperature of 80° C., Charge 4 was added to the reaction mixture. The resulting material was found to have a measured solids content of (110° C., 1 hr) of 98.5 percent, a viscosity of Z5 on the Gardner-Holt scale, a density of 8.48 lb/gal, a total amine content of 3.199 meq/g, a primary amine content of 0.027, a secondary amine content of 3.172, a tertiary amine content of 0.000, a $M_w$ of 815 and a $M_n$ of 499 as determined by gel permeation chromatography vs. a polystyrene standard.

Example H

An amine/acrylate curative was prepared from the following ingredients:

| Ingredient | Wt in g |
| --- | --- |
| Charge 1 | |
| butylamine | 109.5 |
| Charge 2 | |
| Trimethylolpropane triacrylate | 147.0 |

Charge 1 was added to a suitable reactor equipped with an overhead stirrer, thermocouple, condenser, and $N_2$ inlet. The charge was placed under an $N_2$ blanket. Beginning at a temperature of 21° C., Charge 2 was added to the reactor over a period of 55 minutes. A mild exotherm was observed during the addition. At the completion of the charge, the temperature of the reaction mixture was 30° C. The contents of the reactor were heated to 30-31° C. with an external heat source and held at this temperature for 2.25 hours. Inspection of the infrared spectrum at this time indicated consumption of the acrylate (absence of peaks at 1621, 1635 cm$^{-1}$). The resulting material was found to have a measured solids content of (110° C., 1 hr) of 93.4 percent, a viscosity of C-D on the Gardner-Holt scale, a density of 8.181 lb/gal, and a $M_w$ of 437 and a $M_n$ of 430 as determined by gel permeation chromatography vs. a polystyrene standard.

Example 1

An isocyanate functional "A" side formula was prepared from the following ingredients:

| Ingredients | % by wt |
| --- | --- |
| TERATHANE 650[3] | 21.0 |
| 1,2-butanediol | 1.2 |
| Neopentyl glycol | 1.2 |
| Isophorone diisocyanate | 27.1 |
| DESMODUR N 3400[4] | 49.4 |

[3]Polytetramethylene ether glycol, available from Invista.
[4]Aliphatic polyisocyanate resin based on hexamethylene diisocyanate, available from Bayer Corporation.

TERATHANE 650, neopenyl glycol, 1,2-butanediol, and a catalytic amount of dibutyltin dilaurate (0.013% by wt of the three glycols) were charged to a suitable reactor under nitrogen. Isophorone diisocyanate was added to the reactor over 105 minutes at a temperature range of 36-37° C. Over a period of 50 minutes the temperature of the mixture was increased to 52° C. Over a period of 60 minutes the temperature increased to a maximum of 125° C. After another 60 minutes the resulting prepolymer equivalent weight was found to be within specification. The resulting prepolymer was cooled to 71° C. and poured into 87.9% of the DESMODUR N3400 and stirred for 30 minutes. The remaining DESMODUR N 3400 was added to adjust to a final isocyanate equivalent weight of 264.9.

Examples 2-3

Pigment grinds were prepared according to the formulas in Table 1:

TABLE 1

| Ingredient | Example 2 (wt in parts) | Example 3 (wt in parts) |
| --- | --- | --- |
| JEFFAMINE T3000[5] | 25.0 | 22.0 |
| Amine/aspartate of Example C | 28.0 | 39.0 |
| VULCAN XC72[6] | 1.2 | 1.2 |
| BYK 9077[7] | 0.6 | |
| BENTONE 34[8] | 3.0 | 3.5 |

[5]Polyoxyalkylenetriamine of approximately 3000 MW, available from Huntsman Corporation.
[6]Carbon black pigment, available from Cabot Corporation.
[7]Dispersing agent, available from Byk-Chemie GmbH.
[8]Organoclay rheology additive, available from Elementis Specialities, Inc.

In each example, the ingredients were combined and charged to a Premier Mill HM 1.5 VSD Series SuperMill (SPX Corporation) with an 85 percent charge of 1.0 mm Mill Mates Plus TZP grind medium (Zircoa, Inc.) and ground at a mill speed of 2400 rpm. The grinds were judged to be complete when the particle size was found to be 7.5 Hegman upon drawdown on a fineness of grind gauge.

Examples 4-5

Base mixes were prepared according to the formulas in Table 2:

TABLE 2

| Ingredient | Example 4 | Example 5 |
| --- | --- | --- |
| Pigment grind of Example 2 | 1329.2 | |
| Pigment grind of Example 3 | | 3087.4 |
| N-(3-triethoxysilylpropyl)-4,5-dihydroimidazole | 0.58 | 1.20 |
| N-(n-butyl)-3-aminopropyltrimethoxysilane | 0.65 | 1.32 |
| Dibutyltin dilaurate | 11.5 | 23.5 |
| TINUVIN 328[9] | 0.58 | 1.2 |
| TINUVIN 292[10] | 11.5 | 23.5 |

[9]UV absorber, available from Ciba Speciality Chemicals Corporation.
[10]Hindered amine light stabilizer, available from Ciba Speciality Chemicals Corporation.

Examples 6-8

The following "B" side formulations were produced according to the formulas in Table 3:

TABLE 3

| Ingredient | Example 6 (3528-22-6) | Example 7 (3528-22-9) | Example 8 (3528-19-9) |
| --- | --- | --- | --- |
| Base mix of Example 4 | 220.8 | 220.8 | |
| Base mix of Example 5 | | | 253.7 |
| JEFFAMINE T3000 | | 3.8 | 10.6 |
| JEFFLINK 754[11] | 45.8 | | 27.7 |
| Amine/aspartate of Example C | 13.1 | 7.5 | |
| Amine/acrylate curative of Example A | 93.8 | 50.6 | 57.0 |
| Amine/epoxy adduct of Example B | | 90.8 | |
| Acrylate/aspartate amine curative of Example D | | | 26.6 |

[11]Aliphatic secondary amine, available from Huntsman Corporation.

The B side formulations of Table 2 above and the A side formulation of Example 1 were charged to separate canisters and heated to 140° F. in an oven for 1-3 hrs prior to spraying. Polyurea coating compositions were produced by mixing a 1:1 volume ratio of the A-side components to each the B-side components in a static mix tube applicator device available from Cammda Corporation. The coating compositions were applied to cold rolled steel panels coated with an electrodeposition primer and an epoxy acid clearcoat (NDCT 5002A available from PPG Industries, Inc.). Tack times for the coatings were determined by periodically touching the panel with a gloved hand as previously described and were judged to be tack free when the glove no longer stuck to the coatings.

Hardness values were determined by charging the unheated A and B side components into a double-barreled syringe equipped with a static mix tube and a Model 415-0011-00 50 mL 1:1 manual dispenser (Cammda Corporation) and injecting the components at a 1:1 ratio using a into a mold to form a "puck" of approximately 5 cm in diameter and approximately 100 mils thick. The hardness of the polyurea coating puck at ambient temperature was measured on the Shore D scale with a Model 212 Pencil Style Digital Durometer (Pacific Transducer Corp.) 1 day after application. The pucks were then placed in a 140° F. oven for 1 day and the Shore D hardness of the coating measured with the puck in the oven to prevent cooling. The pucks were removed from the oven to ambient temperature and the hardness measured again at ambient temperature after 1 day.

The ratio of equivalents of isocyanate to amine was calculated as being 1.034 for the polyurea formulation comprising the B side component of Example 6 and 1.296 for the polyurea formulation comprising the B side component of Example 7. The ratio of equivalents of isocyanate to amine and hydroxyl was 1.077 for the polyurea formulation comprising the B side component of Example 8.

The following properties of the polyurea coatings were determined as shown in Table 3.

TABLE 3

| | Example 6 | Example 7 | Example 8 |
| --- | --- | --- | --- |
| Tack free time (sec) | 22 | 61 | 47 |
| Hardness (Shore D) 1 day* after cure, ambient temperature | 56 | 52 | 50 |
| Hardness (Shore D) after 1 day at 140° F. | 23 | 28 | 22 |

TABLE 3-continued

|  | Example 6 | Example 7 | Example 8 |
|---|---|---|---|
| Hardness (Shore D) 1 day at ambient temperature after 140° F. | 50 | 51 | 44 |

*Example 8 measured 2 days after cure

Therefore, what is claimed is:

1. A metallic substrate coated at least in part with a multi-layer coating composite comprising at least one of an electrocoat layer, a base coat layer, and a clearcoat layer; and a coating comprising a polyurea formed from a reaction mixture comprising:
   a) a first component comprising isocyanate; and
   b) a second component comprising a (meth)acrylated amine reaction product of a monoamine and a poly(meth)acrylate, and at least one additional amine selected from
      i. a reaction product of a (meth)acrylate, a dialkyl maleate and/or dialkyl fumarate, and an amine;
      ii. a reaction product of a polyamine and a compound comprising an epoxy group;
      iii. a diamine of structure

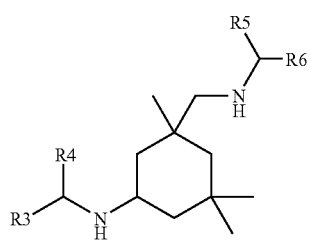

wherein R3-R6 are independently C1-C10 alkyl; and/or
iv. a diamine of structure

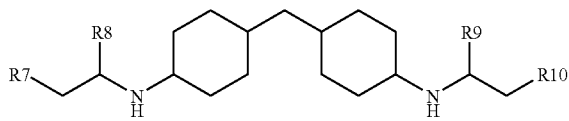

wherein R7-R10 are independently C1-C10 alkyl;
wherein the ratio of equivalents of isocyanate groups in a) to equivalents of amine groups in b) is greater than 1 and the first and second components can be applied to the substrate at a volume mixing ratio of 1:1.

2. The substrate of claim 1, wherein the ratio of equivalents of isocyanate groups to equivalents of amine groups is from 1.004:1 to 1.5:1.

3. The substrate of claim 1, wherein the isocyanate comprises isocyanate prepolymer.

4. The substrate of claim 1, wherein the monoamine comprises 2-ethylhexylamine, butylamine, and/or cyclohexylamino.

5. The substrate of claim 1, wherein the poly(meth)acrylate comprises trimethylolpropane triacrylate.

6. The substrate of claim 1, wherein the monoamine comprises 2-ethylhexylamine and the poly(meth)acrylate comprises trimethylolpropane triacrylate.

7. The substrate of claim 1, wherein the at least one additional amine comprises the reaction product of a (meth)acrylate, a dialkyl maleate and/or dialkyl fumarate, and an amine.

8. The substrate of claim 1, wherein the the at least one additional amine comprises the reaction product of a polyamine and a compound comprising an epoxy group.

9. The substrate of claim 1, wherein the polyurea comprises two or more (meth)acrylated amine reaction products, wherein the monoamine(s) and poly(meth)acrylate(s) in each reaction product can be the same or different.

10. The substrate of claim 1, wherein the substrate comprises at least a portion of a vehicle.

11. The substrate of claim 10, wherein the substrate comprises a truck bed.

12. The substrate of claim 11, wherein the color of the coated truck bed substantially matches that of the associated vehicle body.

13. The substrate of claim 1, wherein the polyurea coating imparts a textured surface to the substrate.

14. The substrate of claim 1, comprising at least two of an electrocoat layer, a base coat layer and a clearcoat layer, in addition to the polyurea layer.

15. The substrate of claim 14, comprising an electrocoat layer, a base coat layer and a clearcoat layer, in addition to the polyurea layer.

16. A substrate coated at least in part with a coating comprising a polyurea formed from a reaction mixture comprising:
   a) a first component comprising isocyanate; and
   b) a second component comprising a (meth)acrylated amine reaction product of a monoamine and a poly(meth)acrylate, and at least one additional amine selected from
      i. a reaction product of a (meth)acrylate, a dialkyl maleate and/or dialkyl fumarate, and an amine;
      ii. a reaction product of a polyamine and a compound comprising an epoxy grow;
      iii. a diamine of structure

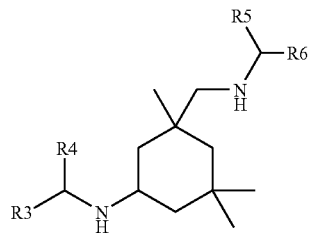

wherein R3-R6 are independently C1-C10 alkyl; and/or
iv. a diamine of structure

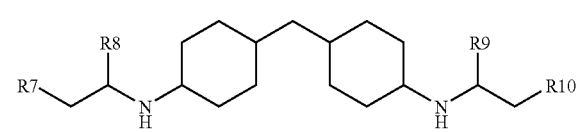

wherein R7-R10 are independently C1-C10 alkyl;
wherein the ratio of equivalents of isocyanate groups in a) to equivalents of amine groups in b) is greater than 1.3:1 and the first and second components can be applied to the substrate at a volume mixing ratio of 1:1.

17. A building having a building component coated at least in part with a coating comprising a polyurea formed from a reaction mixture comprising:

a) a first component comprising isocyanate; and
b) a second component comprising a (meth)acrylated amine reaction product of a monoamine and a poly(meth)acrylate, and at least one additional amine selected from
i. a reaction product of a (meth)acrylate, a dialkyl maleate and/or dialkyl fumarate, and an amine;
ii. a reaction product of a polyamine and a compound comprising an epoxy group;
iii. a diamine of structure

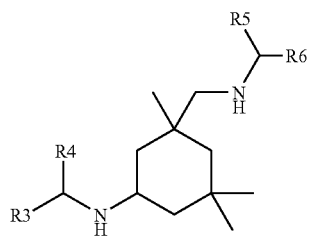

wherein R3-R6 are independently C1-C10 alkyl; and/or
iv. a diamine of structure

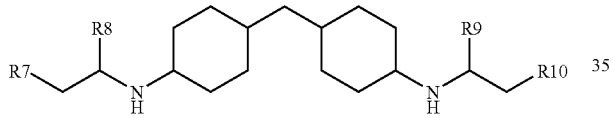

wherein R7-R10 are independently C1-C10 alkyl; wherein the ratio of equivalents of isocyanate groups in a) to equivalents of amine groups in b) is greater than 1 and the first and second components can be applied to the building component at a volume mixing ratio of 1:1.

18. A coating composition comprising polyurea formed from a reaction mixture comprising:

a) a first component comprising isocyanate; and
b) a second component comprising an a (meth)acrylated amine reaction product of a monoamine and a poly(meth)acrylate and at least one additional amine selected from
i. a reaction product of a (meth)acrylate, a dialkyl maleate and/or dialkyl fumarate, and an amine;
ii. a reaction product of a polyamine and a compound comprising an epoxy group;
iii. a diamine of structure

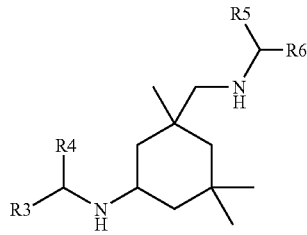

wherein R3-R6 are independently C1-C10 alkyl; and/or
iv. a diamine of structure

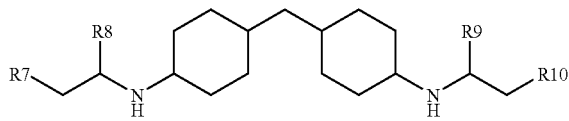

wherein R7-R10 are independently C1-C10 alkyl.

19. The coating composition of claim 18 wherein the additional amine comprises a reaction product of a (meth)acrylate, a dialkyl maleate and/or dialkyl fumarate, and an amine.

20. The coating composition of claim 18 wherein the additional amine comprises a reaction product of a polyamine and a compound comprising an epoxy group.

21. The coating composition of claim 18 wherein the additional amine comprises a diamine of structure

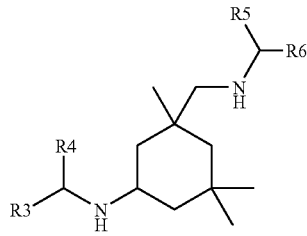

wherein R3-R6 are independently C1-C10 alkyl.

22. The coating composition of claim 18 wherein the additional amine comprises a diamine of structure

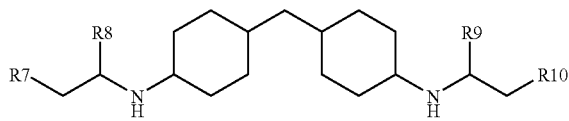

wherein R7-R10 are independently C1-C10 alkyl.

* * * * *